United States Patent
Deni et al.

[19]

[11] Patent Number: 5,957,339
[45] Date of Patent: Sep. 28, 1999

[54] WATER FILTRATION SYSTEM

[75] Inventors: Joseph A. Deni; Leonard A. Deni, both of E. Amherst, N.Y.

[73] Assignee: Keystone Manufacturing Co., Inc., Buffalo, N.Y.

[21] Appl. No.: 08/880,908

[22] Filed: Jun. 23, 1997

[51] Int. Cl.[6] ....................................................... B67D 5/58
[52] U.S. Cl. ......................... 222/190; 222/5; 222/189.06; 261/DIG. 7; 261/4; 261/5
[58] Field of Search ........................... 222/5, 190, 189.06; 261/DIG. 7, 4, 5

[56] References Cited

U.S. PATENT DOCUMENTS

| | | | |
|---|---|---|---|
| 4,049,550 | 9/1977 | Obidniak | 210/152 |
| 4,609,466 | 9/1986 | McCausland et al. | 210/244 |
| 5,021,250 | 6/1991 | Ferguson | 426/231 |

*Primary Examiner*—Andres Kashnikow
*Assistant Examiner*—David Deal
*Attorney, Agent, or Firm*—James J. Ralabate

[57] ABSTRACT

This invention provides an easy to carry unit that contains a water filtration and a water carbonation chamber. The water after filtration more easily absorbs $CO_2$ and allows for a more readily provided source of filtered carbonated water. The unit utilizes off-the-shelf carbonation cartridges and has a simple hose attachment to a conventional home faucet.

14 Claims, 5 Drawing Sheets

WATER FILTRATION SYSTEM

This invention relates to a water filter system and, more specifically, for a household apparatus that will both filter and carbonate water from the faucet.

BACKGROUND OF THE INVENTION

There are many situations where both or either a purified and/or carbonated water is desired. For example, at parties it is common for individuals to request soda water alone or in mixed drinks. Also, because of fluorinated tap water, it is not unusual for people to buy bottled water or purchase a filter for use with their tap water.

Several systems are known for the use of plumbing fixtures or apparatus for supplying carbonated water to a user. Typical of these systems are the structures disclosed in U.S. Pat. No. 1,836,329 (Lombard); U.S. Pat. No. 3,761,066 (Wheeler); U.S. Pat. No. 4,597,509 (Pereira) and U.S. Pat. No. 5,021,250 (Ferguson).

In Lombard a typical device is shown for the preparation of carbonated water where water is fed into a mixing unit and then goes to the soda fountain for placing into a glass or other receptacle. Lombard is concerned with a system for providing volumes of gas and water which are admitted to the carbonator automatically and will be maintained at a substantially constant and predetermined ration regardless of the pressure variation of the water system. Obviously, Lombard's system is devised for commercial soda fountain usage and is designed to be installed permanently into the plumbing system. Also, Lombard permits only dispensing of carbonated or soda water from his system.

The Wheeler patent discloses an inline carbonation system that utilizes a $CO_2$ container with a pressure regulator, an electric motor driven pump and other complicated system components. Wheeler is not concerned with filtered water but rather only with the carbonation of fresh water. Wheeler utilizes the flow of $CO_2$ and water towards the dispenser valve to agitate and mix the $CO_2$ and water. To carry out Wheeler's invention, a conduit is installed in the line leading to the carbonated water dispenser valve and tap or fresh water and $CO_2$ are introduced into the unit one end and are thoroughly mixed as the water passes through the conduit to the dispensing valve. Wheeler's system is adapted for commercial usage and involves only a carbonation unit and not water purification.

In Pereira, U.S. Pat. No. 4,597,509, a system is disclosed that provides plain and carbonated water from a reservoir. The unit contains; a refrigeration unit to temperature control the output of the system. Pereira's system consists of a reservoir for retaining uncarbonated drinking water and a first heat exchange associated with the reservoir. The system is supplied with a fluid refrigerant for maintaining the water at an optimum drinking temperature. The reservoir has a dispensing faucet for dispensing uncarbonated water. Also, there is a second heat exchanger located within the reservoir and a pump to take drinking water from the reservoir and deliver it to the carbonator. The carbonated water is supplied to the inlet of the second heat exchanger. A second faucet is connected to the outlet of the second heat exchanger to dispense the carbonated water. Pereira uses a tank 23 containing carbon dioxide under pressure which in turn is installed into the system. The reservoir in his system is usually a large bottle similar to that used in drinking water dispensers used in offices and the like. The Pereira system also is adapted for commercial usage with non-portable components. Also, his system dispenses carbonated and uncarbonated water from a reservoir and not a piped source.

In the Ferguson U.S. Pat. No. 5,021,250, an apparatus is disclosed for installation into the plumbing of a house or commercial establishment. Ferguson permanently installs pipes, reservoirs, sumps, filters, turbulation units and gas tanks in the plumbing system of a structure. His apparatus then supplies water to a purification system, supplying $CO_2$ gas from a tank to the pre-purified liquid and dispensing from a reservoir either a carbonated and purified supply of water or purified water only from the tap. The complexity of the plumbing attachments of Ferguson's system together with the space requirements for a tank, etc. make his system generally limited for household usage.

SUMMARY OF THE PRESENT INVENTION

It is therefore an object of this invention to provide a portable filter-carbonation apparatus devoid of the above-noted disadvantages.

Another object of this invention is to provide a small, compact and relatively simple device that can be attached to the outlet of a conventional faucet to become functional.

Still a further object of this invention is to provide a novel system that both purifies and carbonates tap water in a relatively uncomplicated system.

Another object of this invention is to provide a water filtering-carbonation system that dispenses water upon demand without the requirements of a storage vessel or reservoir.

Yet another object of this invention is to provide an easy to use, portable device that dispenses both or either plain filtered water or filtered carbonated water.

It is a further object of this invention to provide an uncomplicated unit that uses off-the-shelf conventional components easily accessible and available to the household users.

An additional object of this invention is to provide a filter-carbonator water unit that is easily connected to the outlet of a conventional home tap or faucet.

These and other objects of this invention are accomplished by a portable unit that comprises a conduit adapted for connection to a conventional faucet, a filter housing, a carbon dioxide pressure chamber, a carbon dioxide cartridge container and at least one spigot to dispense water from the unit. Preferably, there is a spigot for the plain purified water and a second spigot to dispense the purified carbonated water. This preferred, two spigot embodiment provides for users who optionally want at a given time only purified water and for those who would like only purified-carbonated water. Conventional water filters may be used in the filter housing such as those disclosed in U.S. Pat. Nos. 3,950,253; 3,963,620; 4,312,754; 4,049,550 and 4,609,466. Many typical and suitable filters are available from U.S. Filter Corporation or from Culligan Water Conditioning. Culligan is a trademark of Culligan Water Conditioning Inc. Any suitable filter may be used in the present device such as Keystone filter Model No. 6601. Any suitable carbon dioxide cartridges useful in the device of the present invention may be used such as those available from Ultra Pure Systems Inc. located at P.O. Box 115, Northwood, Ill. 60065-0115, a subsidiary of Culligan Water Technology Inc. The $CO_2$ cartridge fits into a housing located at the upper portion of the carbonation chamber.

The device of this invention provides a home use apparatus or device that supplies the user, upon demand, a non-limiting amount of purified carbonated water, rather than going to the supermarket or fountain to purchase bottled carbonated water in limited sizes and volumes.

There are various embodiments of the unit of the present invention that are provided hereby. In a first embodiment, a single spigot located subsequent to the $CO_2$ pressure chamber dispenses only purified-carbonated water. In a second embodiment, two spigots are installed in the unit, one after the filter housing and a second spigot after the $CO_2$ pressure chamber. A third embodiment provides a bypass conduit that will bypass the $CO_2$ chamber and direct the filtered plain water out a common spigot.

The flow path of water through the present unit is a water inlet means from a faucet to a filtration chamber to a carbonation chamber and out a unit spigot or spout subsequent in said water flow path to the carbonation chamber. Optionally, outlet spouts may be located after the filtration chamber and/or after the carbonation chamber. By "after" is meant later in the water flow path as shown in the drawings.

Features and conditions required in the present portable filtration-carbonation system are as follows:

The system still will be based on a demand flow only. When the diverter is pulled water flows through the system but there is no constant pressure on the filter. At no time will the system be in constant through the water entering in order to fall under compliance of local plumbing codes.

To introduce carbonation, a separate container will be designed for mixing. The vessel has to withstand pressure and the flow into and out of the vessel needs to be restricted through a check valve or manual valve during mixing.

The system could have two spouts or two independent plumbing lines for dispensing carbonated water and filtered water.

The volume of the vessel for mixing the $CO_2$ will be tailored to currently available $CO_2$ cartridges, approximately a quart.

The product system is hooked up to the spout of a conventional kitchen faucet and activated through the diverter. It will deactivate itself once the flow of the faucet is interrupted.

Best starting conditions for mixing $CO_2$ with water:

The water should have a high level of purity. The water should always be run through the filter first.

The higher the pressure in the mixing vessel the better the condition for absorbing the $CO_2$ into the water. In the passive system, the sole pressure will be created by the expanding $CO_2$ and will be limited to that. Any air should be evacuated from the chamber.

The water temperature needs to be as cold as possible to increase the density of the water and the mixing process. The mixing vessel should be filled with fresh tap water for each batch; the cooler the better.

Ideally, the tank should be purged of all air before introducing the $CO_2$. A venting valve needs to be incorporated to allow the water to enter and air to escape during filling.

Absorbing $CO_2$ in water:

The introduction of the $CO_2$ in a passible system needs to be through the bottom of the vessel letting the $CO_2$ rise through the water in a fine, distributed bubble pattern with maximum exposure to the water.

In soft drink systems, a mechanical agitator is used to constantly mix the $CO_2$ with the water and then introduce the syrup, or In a commonly used seltzer bottle for bar use, the mixing is accomplished through shaking vigorously.

All of the major components of the portable unit of this invention are located within a single portable housing; only the water inlet and outlet means are located outside the housing.

DETAILED DESCRIPTION OF THE DRAWING AND PREFERRED EMBODIMENTS

Figure 1:
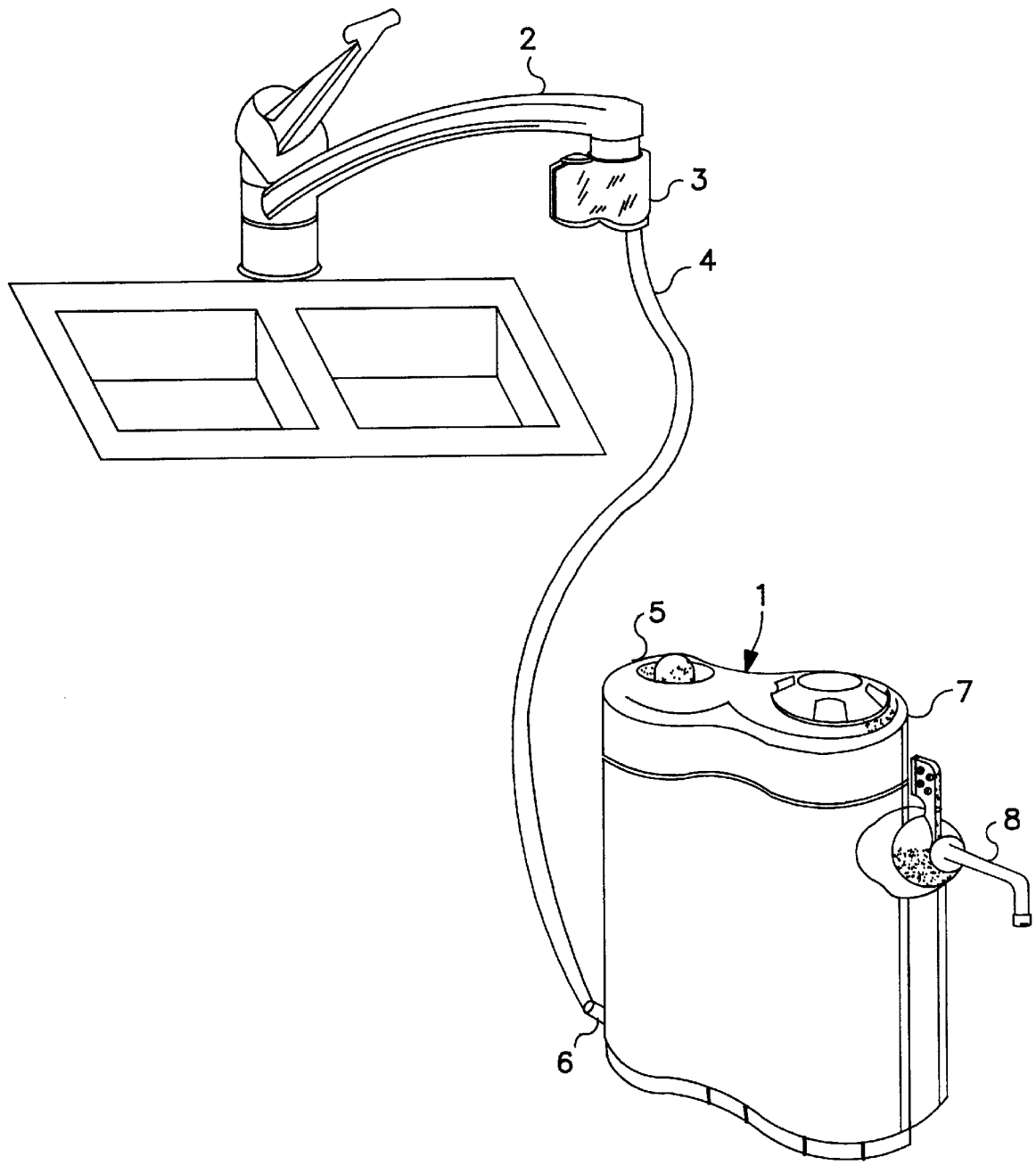
FIG. 1 is a perspective side view of the unit of this invention when connected to the outlet of a tap, faucet or spigot.
Figure 2:
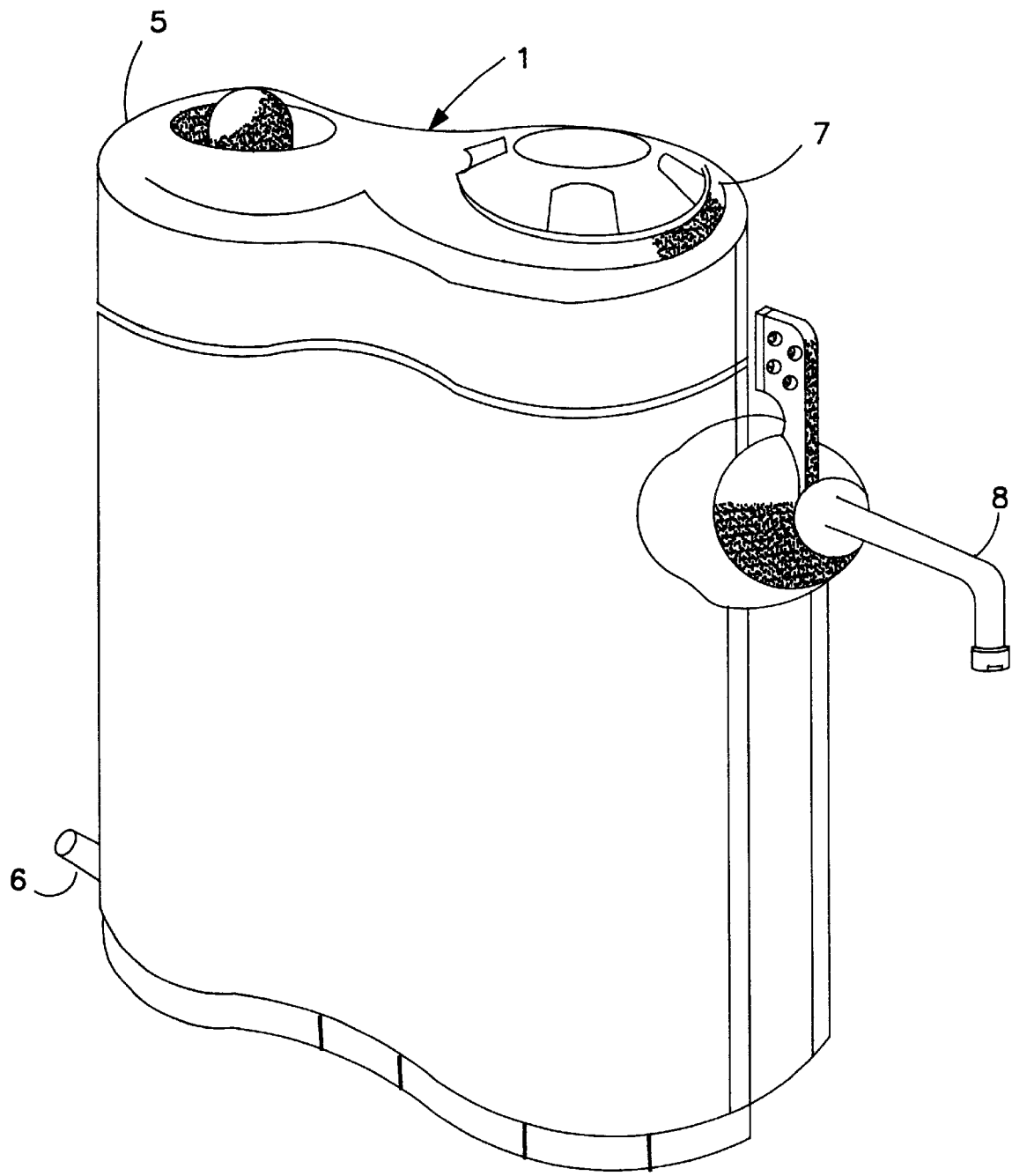
FIG. 2 is a perspective side view of one first embodiment of the present invention.
Figure 4:
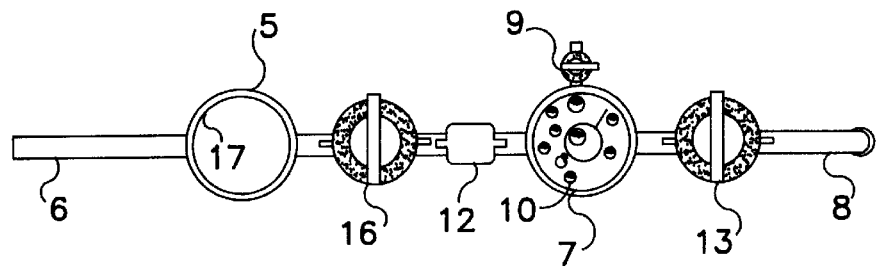
FIG. 4 is a top plan view of a first embodiment of the present invention.
Figure 3:
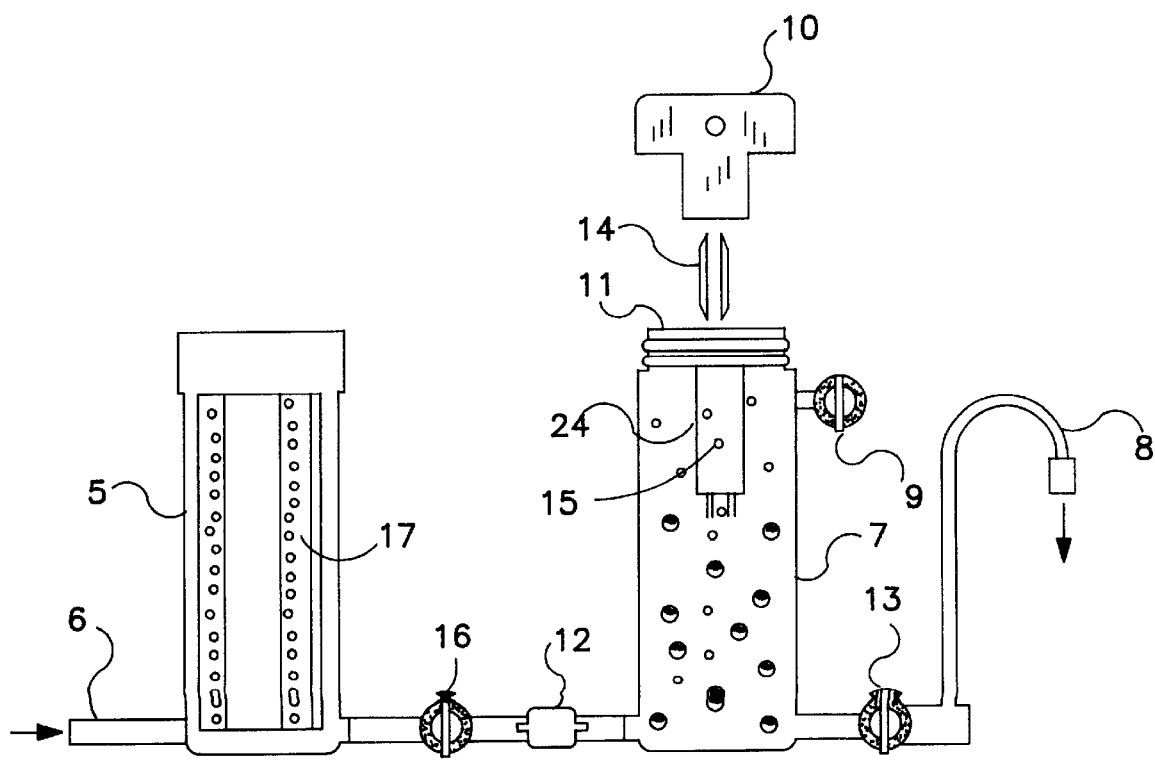
FIG. 3 is a plan cross sectional side view of a first embodiment of the present invention.
Figure 6:
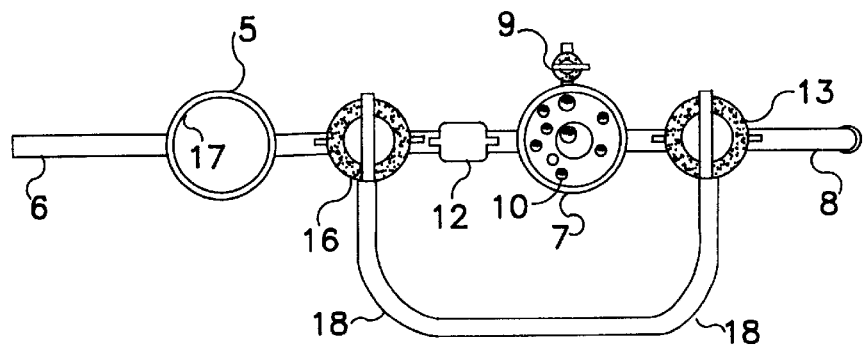
FIG. 6 is a plan top view of a second embodiment of the unit of this invention.
Figure 5:
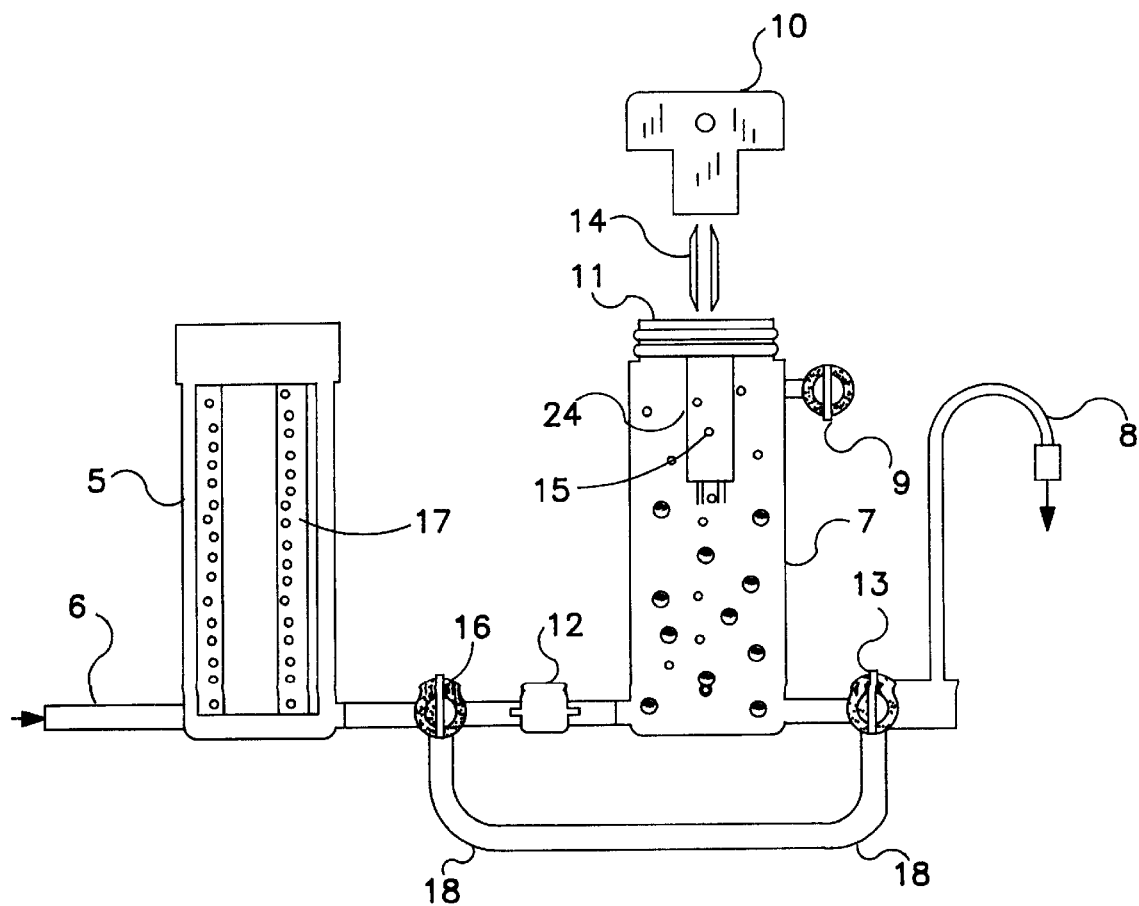
FIG. 5 is a plan cross sectional side view of a second embodiment of the present invention.
Figure 8:
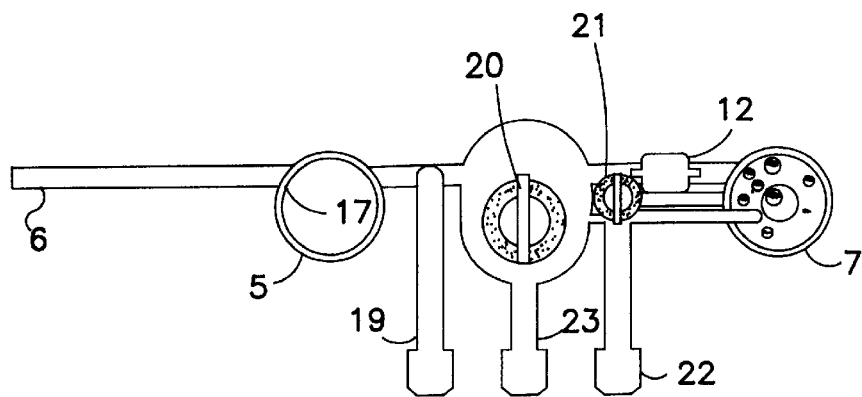
FIG. 8 is a plan top view of a third embodiment of the unit of this invention.
Figure 7:
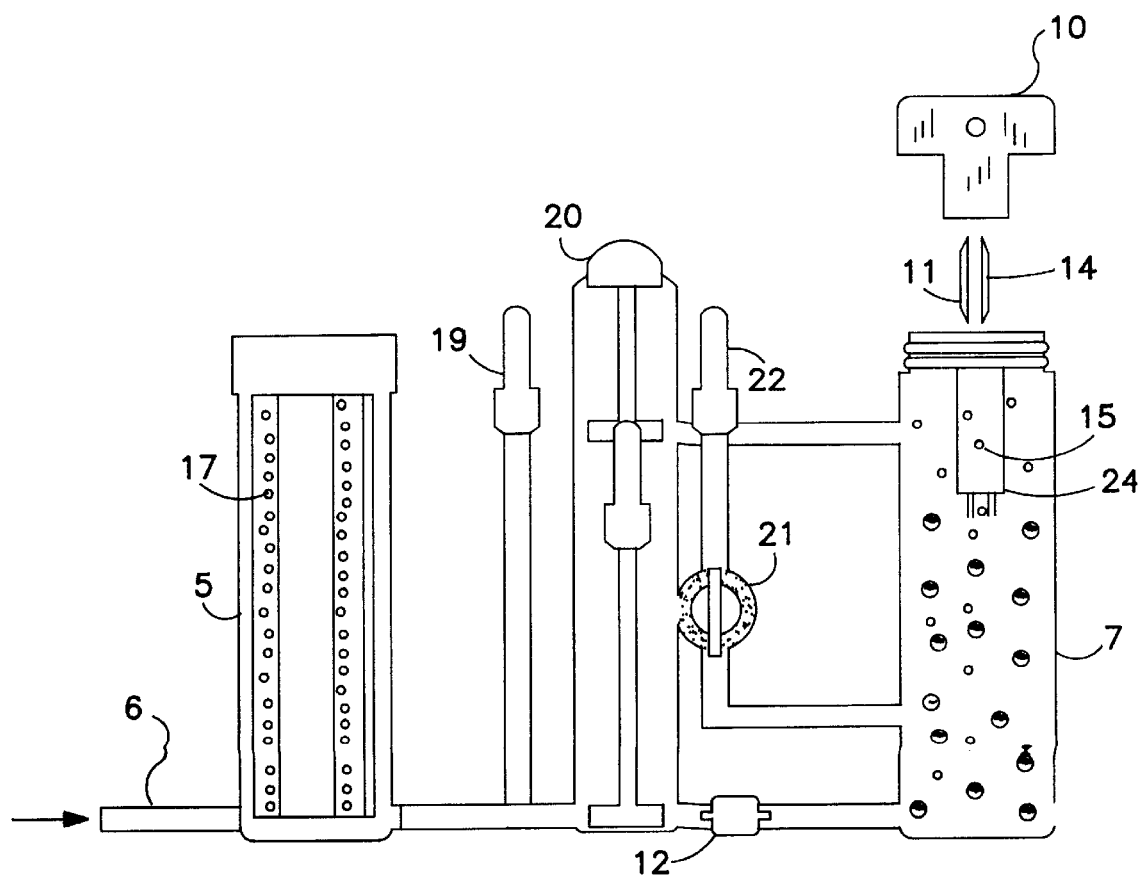
FIG. 7 is a plan side view of a third embodiment of the unit of this invention.

In FIG. 1, the unit or unit housing 1 of this invention is shown connected to a conventional faucet 2 used in the kitchen of a home. The faucet is fitted with a conventional diverter 3 to which a rubber tube 4 is connected. The unit 1 contains a filter housing 5 which is always closest to the tap 2; in other words, the water intake 6 is always located in the filter housing 5. This is critical to the present invention because raw tap water will not readily absorb carbon dioxide whereas filtered or purified water will much more readily absorb carbon dioxide ($CO_2$). Thus, the filtering step in the unit or unit housing 1 filters and prepares the tap water for $CO_2$ absorption in the next adjoining station or $CO_2$ pressure (carbonation chamber) 7. A spigot 8 dispenses the filtered-carbonated water from unit 1 after both the filtration and carbonation of the tap water entering the system via faucet or tap 2. The flow path of water through the unit 1 is easily controlled by turning faucet 2 on or off, thus fresh water is provided through the system without the need of a reservoir or collection vessel. An air vent 9 (shown in FIGS. 3 and 4) is used to expel air from unit 1 prior to filling the system of unit 1 with tap water in order to permit easy flow of water through unit 1. Carbon dioxide chamber 7 is fitted with a pressure cap 10 which when screwed into the opening 11 of chamber 7 will puncture the $CO_2$ cylinder which is located in cartridge housing 24 and dispense $CO_2$ into water contained in $CO_2$ pressure chamber 7. It is important to this invention that except for water inlet means 6 and water outlet means 8, all components are housed and located within a unitary or single portable housing. In FIG. 3 a plan cross section side view of unit 1 is illustrated. Tap water enters filter housing 5 through water intake 6 located in the filter housing 5. The water enters the filter chamber 5 and flows through a check valve 12 to the $CO_2$ mixing canister 7. Check valve 12 in front of the mixing canister or $CO_2$ chamber 7 will not allow accidental back flow of the water. The mixing vessel or $CO_2$ chamber 7 consists of a twist cap 10 that contains the $CO_2$ cartridge and activates the flow of $CO_2$ by twisting cap 10 when installing it into $CO_2$ chamber opening 11. An air venting valve 9 is necessary to be able to evacuate the air from the vessel 1 while filling it with water from faucet 2. The valve 9 must be closed before injecting the $CO_2$; valve 9 and vessel spout 8 both must be manually open and closed for proper functioning of portable unit 1. A dispensing valve 13 can be turned on or off to dispense (or turn off) the water through vessel spout or unit outlet means 8. The twist cap 10 has a piercing blade or extension 14 which pierces the cartridge 15 which is held in cartridge housing 24 to allow $CO_2$ gas into the water-filled $CO_2$ chamber 7. An optional (filtered water only) valve 16 may be used located between filtering housing 5 and $CO_2$ chamber 7 in order to dispense filtered uncarbonated water only if desired. This optional but preferred valve 16 can be seen in FIG. 4. All of the components of unit 1 including valves, filters 17 and $CO_2$ cartridges are readily available off-the-shelf items. To enhance and expedite the carbonation, agitation or shaking of the carbonation chamber may be accomplished. Since the unit 1 is so lightweight, shaking the entire unit 1 slightly should be no problem. The components of unit 1 are preferably lightweight but strong polymers or copolymers such as polycarbonates, polyurethanes, polyamides, polyesters, polyvinyl materials and mixtures thereof. In FIGS. 5 and 6 second embodiment of unit 1 is illustrated. In this embodiment, the tap water enters from water intake or inlet 6, flows into the filter chamber 5, through the same type check valve 12 (as in FIG. 3) to hinder any backflow and into the mixing vessel or $CO_2$ chamber 7. A bypass 18 allows the use of filtered water only even when the $CO_2$ has been introduced via puncturing and activation of $CO_2$ cartridge 15. The filtered water enters bypass conduit 18, bypasses the $CO_2$ chamber 7 by open valve 16 and is dispersed through unit spigot 8. When both filtered and carbonated water is desired both two-way valves 13 and 16 are in the open position to permit water to flow therethrough. The same pressure cap 10 and piercing blade 14 is used in all embodiments described herein. Also, a vent valve 9 is necessary in all embodiments in order that air be released from unit 1 before water will freely flow theein. Another universal requirement for all embodiments herein is that the water inlet 6 be located in the filtration chamber 5 and that check valve 12 be located between chamber 5 and $CO_2$ chamber 7 to prevent any unintended backflow of water and to allow only one-way water flow toward the $CO_2$ chamber. In FIGS. 7 and 8 a third embodiment of the invention is illustrated wherein water enters as in previous embodiments through tap water inlet 6. The water then enters the filter chamber 5 and then optionally to a filter water spout 19. A central valve-block 20 will be turned by the user to open the inlet into $CO_2$ chamber 7 and to open the venting valve 21 to evacuate the air from the system. The central valve block 20 will automatically return to a closed position and the carbonated water will be dispensed from a separate spout 22. A $CO_2$ vent 23 is provided to vent out any access $CO_2$ formed in the system. In all of the vents in every embodiment of this invention an aperture is provided that extends internally of unit 1 to the atmosphere. The various venting means merely open or close this venting aperture. Obviously, many variations may be used in each embodiment if desired.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A portable water carbonation-filtration unit with components that comprise connection means for easy connection and disconnection to a water faucet outlet, water inlet means, at least one filtration chamber, at least one carbonation chamber, and at least one unit water outlet means, said water inlet means being located in said filtration chamber, means for water to flow only from said filtration chamber to said carbonation chamber and at least one unit water outlet means located in said unit subsequent to a water flow path through said unit, said unit having means located between said filtration chamber and said carbonation chamber to permit only a one-way water flow through said unit, said one-way water flow always being away from said filtration chamber and toward said carbonation chamber, said carbonation chamber containing an air venting valve and a $CO_2$ cartridge housing for holding a $CO_2$ cartridge in place.

2. The portable unit of claim 1 wherein said connection means comprises a faucet diverter with means for connection to said faucet, and a flexible tube or hose for connection to said water inlet means.

3. The portable unit of claim 1 wherein said unit has a unit water outlet means after said filtration chamber and a second unit water outlet means after said carbonation chamber.

4. The portable unit of claim 1 wherein a bypass conduit is located at a point after said filtration chamber and extends beyond and bypasses said carbonation chamber to provide thereby for means to dispense only filtered non-carbonated water from the unit.

5. The portable unit of claim 1 wherein said unit has means to dispense either or both filtered carbonated and non-carbonated water therefrom.

6. The portable unit of claim 1 wherein all of said components except for said water inlet means and said unit water outlet means are located within a unitary portable housing.

7. The portable unit of claim 1 wherein said carbonation chamber comprises means for holding and piercing a carbon dioxide cartridge thereby providing means to carbonate filtered water in said carbonation chamber.

8. A portable water carbonation-filtration unit whereby all components are located within a single portable housing or attached thereto, said unit comprising means for connection or disconnection to an outlet of a water faucet, water inlet means, water outlet means, one filtration chamber and one carbonation chamber, and an air venting valve said water inlet means being located in said filtration chamber which defines thereby the beginning of a water flow path through said unit, means for water to flow thereafter from said filtration chamber to said carbonation chamber, and at least one unit water outlet means located in said unit after said carbonation chamber which defines thereby the termination of a water flow path through said unit, said unit containing means which permits only a water flow path away from said filtration chamber and toward said carbonation chamber, said carbonation chamber containing a $CO_2$ cartridge holder or housing for supporting a $CO_2$ cartridge.

9. The portable unit of claim 8 wherein said connection means comprises a faucet diverter with means for connection to said faucet, sand a flexible tube or hose for connection to said water inlet means.

10. The portable unit of claim 8 wherein said unit has a unit water outlet means after said filtration chamber and a second unit water outlet means after said carbonation chamber.

11. The portable unit of claim 8 wherein a bypass conduit is located at a point after said filtration chamber and extends beyond and bypasses said carbonation chamber to provide thereby for means to dispense only filtered non-carbonated water from the unit.

12. The portable unit of claim 8 wherein said unit has means to dispense either or both filtered carbonated and non-carbonated water therefrom.

13. The portable unit of claim 8 wherein all of said components except for said water inlet means and said unit water outlet means are located within a unitary portable housing.

14. The portable unit of claim 8 wherein said carbonation chamber comprises means for holding and piercing a carbon dioxide cartridge thereby providing means to carbonate filtered water in said carbonation chamber.

* * * * *